June 28, 1966 F. H. ESCH ETAL 3,258,225

SATELLITE MOUNTING STRUCTURE

Filed March 13, 1964

FRED H. ESCH
KENNETH F. READ
LEE H. SCHWERDTFEGER
JAMES F. SMOLA
INVENTORS

BY

Claude Funkhouser
ATTORNEY

3,258,225
SATELLITE MOUNTING STRUCTURE

Fred H. Esch, Silver Spring, Kenneth F. Read, Bowie, and Lee H. Schwerdtfeger and James F. Smola, Silver Spring, Md., assignors to the United States of America as represented by the Secretary of the Navy
Filed Mar. 13, 1964, Ser. No. 351,876
5 Claims. (Cl. 244—1)

This invention relates in general to space satellites and, more particularly, to an improved satellite structure of reduced weight and great strength and providing a high degree of thermal isolation for components housed therein.

In the design of a satellite structure, many factors influence its ultimate configuration. Fundamentally, a satisfactory satellite structure must be sufficiently strong to withstand the stresses encountered in supporting the equipment it carries, yet be light enough to constitute a minimum portion of the satellite's total weight. Moreover, the structure should be designed to attenuate the vibration forces which are present during launch, which vibrations are in the higher frequency ranges and if transmitted directly to electronic devices aboard, would cause damage to such devices. Additionally, the design should provide flexibility in thermal control, whereby portions of the satellite would preserve a constant temperature for the electronic equipment contained therein, while other portions would radiate excess heat, thereby preventing a thermal overload which could cause damage to such equipment. Also, the structure should have a height to diameter ratio adequate for minimum long term temperature excursions and short term temperature stability, thereby maintaining a nearly constant solar energy absorption rate and therefore allowing a predictable outward flow of heat, whereby the electronic equipment will be protected from the radical changes in temperature at the outer skin of the satellite package as said outer skin is periodically exposed to full sunlight and shadow.

One object of the present invention, therefore, resides in the provision of a satellite structure having sufficient strength to withstand the launching forces to which it is subjected, and which will be light in weight.

Another object of the present invention is to provide a satellite structure capable of preventing damaging vibration forces from reaching electronic devices mounted therein.

A still further object of the invention is to provide a satellite structure having flexible thermal control, thereby furnishing complete thermal stability.

Figure 1:
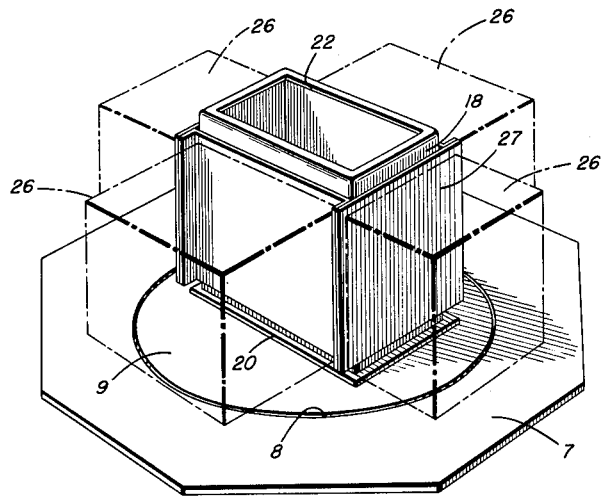
Figure 2:
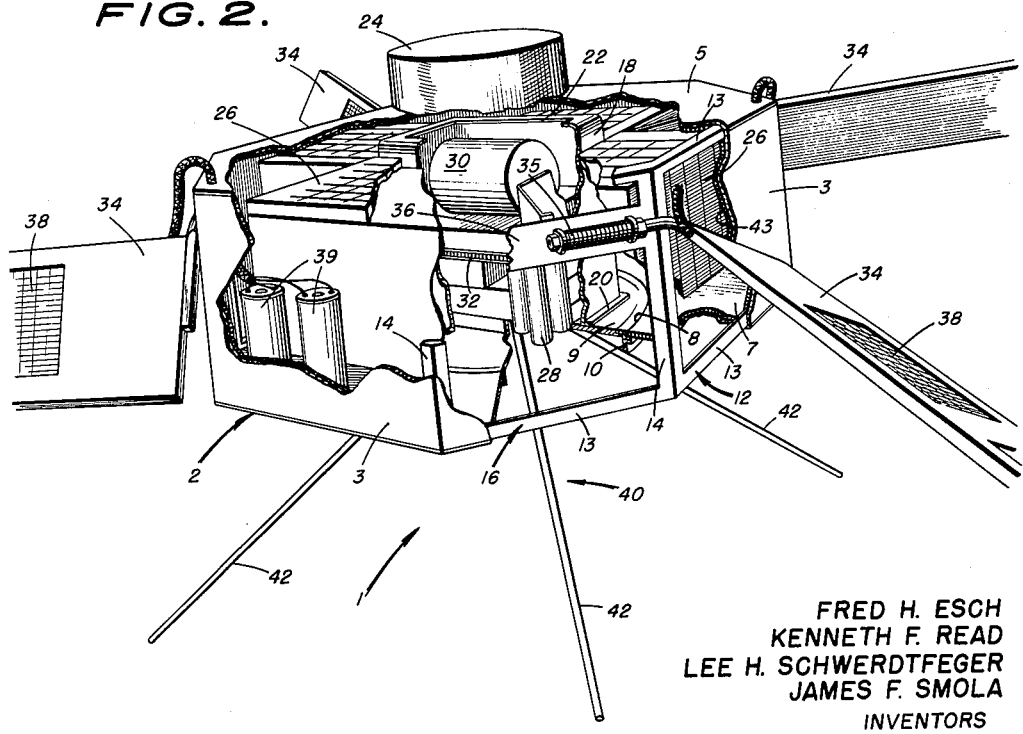

Other objects and many of the attendant advantages of this invention will be readily appreciated as the same becomes better understood by reference to the following description when considered in connection with the accompanying drawings, wherein:

FIG. 1 is a perspective view showing the basic structure constituting the present invention, certain of the components supporting modules being shown in broken lines; and FIG. 2 is a perspective view, partly broken away, showing a satellite embodying the novel features of the present invention.

Briefly, the instant invention comprises a light sheet metal frame providing rigidity and strength, and non-metallic honeycomb top and side panels carried by the frame and forming a right-octagonal, prismatic shaped structure. The bottom of said structure is enclosed by the combination of a bottom panel of honeycomb construction and a beryllium base plate mounted concentrically of said bottom panel. The base plate serves as the main structural support and as a heat radiator to dispense excess heat generated within the satellite. A rectangular thin walled molded Fiberglas tube is mounted on the base plate, which tube extends to the top panel of said structure and supports a plurality of modulator electronic packages.

Referring more particularly to the drawings, a satellite, indicated at 1, is provided with an outer casing or shell 2 comprised of a plurality of side panels 3, a top panel 5, and a bottom panel 7 having therein a central opening 8. As best seen in FIG. 2, the panels 3, 5, and 7 are non-metallic and are of honeycomb construction. A circular beryllium base plate 9 is fastened to the bottom panel 7, said plate 9 having thereon an L-shaped annular flange 10 disposed about its rim, and being of a size to be received snugly in the opening 8 in said panel. The laterally disposed leg of the flange is riveted or otherwise suitably secured to the inner rim of the panel 7. As best seen in FIG. 2, each of the side panels 3 is fastened to a frame 12, which frame is comprised of a plurality of horizontal ribs 13 and vertical support bars 14, said ribs and bars being arranged to form rectangular frame sections 16 which receive said side panels.

A thin walled molded Fiberglas rectangular tube 18 is centrally mounted on the base plate 9 and is formed with a bottom flange 20, which is fastened to said plate, and an upper flange 22, secured to the top panel, which provides support for the top panel 5 and for boom assembly package 24 mounted thereon. As shown in FIG. 1, electronic module packages 26 are mounted cantilever fashion by metal plates 27 on said tube 18. The Fiberglas tube is light in weight and prevents damaging vibration forces from reaching the electronic devices mounted thereon.

High heat generating equipment, such as a Doppler transmitter 28, is mounted directly upon the base plate 9, and separated from a temperature gradient sensitive device, such as a crystal oven 30, by a multi-layer insulation baffle 32. The base plate 9, made of beryllium, has a substantially large area to provide a heat sink for the high heat generating equipment mounted thereon and is exposed outwardly of the satellite 1 to dispense excess heat generated within the satellite. The high stiffness to weight ratio of beryllium makes it an ideal material for the base plate 9 which serves as a main structural support for the devices within the satellite.

As shown in FIG. 2, a plurality of solar cell supporting blades 34 are each equipped with a hinge 35 and are secured thereby to a bracket 36, which bracket is affixed between a pair of adjacent bars 14. A plurality of solar cells, some of which are shown at 38, are mounted on each of said blades 34, which cells, when exposed to the sun, generate electrical energy for charging a plurality of batteries 39 for operating an electromagnet (not shown), the Doppler transmitter 28, the crystal oven 30, and the electronic equipment mounted in the module packages 26. An antenna 40, consisting of a plurality of dipole elements 42, is attached to the base plate 9 for radiating the signals generated by the electronic circuits positioned aboard the satellite 1.

Multi-layer insulation members 43, one of which is shown fragmentarily in FIG. 2, are mounted on the inner surfaces of the panels 3, 5 and 7 for controlling the flow of heat into and out of the satellite. Additionally, no electronic element is mounted directly upon a conductor of high or low temperatures, with the result that said elements are protected from any radical temperature changes that may be imposed upon the outer surface of the satellite.

Obviously, many modifications and variations of the present invention are possible in the light of the above teachings. It is therefore to be understood that within the scope of the appended claims the invention may be practiced otherwise than as specifically described.

What is claimed is:

1. In a space satellite, a satellite structure comprising,
a frame comprising a plurality of frame sections,
side panels carried by the frame and supported in said frame sections,
a top panel closing the upper end of the frame,
a bottom panel closing the lower end of the frame and having a central opening,
a metallic base plate closing the opening, and
satellite instrumentation supporting means mounted on the base plate and having its upper end secured to the top panel.

2. The satellite structure recited in claim 1, wherein said satellite instrumentation supporting means comprises a rectangular tube of non-metallic material, said tube having a bottom flange secured to said base plate and an upper flange secured to said top panel.

3. The satellite structure recited in claim 2, including additionally electronic module packages in the satellite and adjacent the tube, and
plates connecting the module packages to the tube.

4. The satellite structure recited in claim 2, including additionally a temperature gradient sensitive device mounted within the tube,
a heat producing device in the tube, and
insulation means in the tube between the temperature gradient sensitive device and the heat producing device.

5. In a space satellite, a satellite structure comprising
a frame of right-octagonal prismatic shape and including a plurality of frame sections,
top, bottom and side panels fitted in the frame section and cooperating therewith to provide a closed satellite body,
said bottom panel having a central opening,
a base plate mounted in the central opening,
a non-metallic tube mounted on the base plate and having a bottom flange secured to said base plate,
said tube having a flange at its upper end and supporting said top panel,
solar cell supporting blades,
means hingedly mounting said blades on the frame,
solar cells on the blades, and
batteries within the satellite body and connected to the solar cells.

No references cited.

FERGUS S. MIDDLETON, *Primary Examiner.*